Oct. 16, 1928.
E. PIQUEREZ
1,687,789
LUBRICANT COMPRESSOR
Filed April 16, 1925
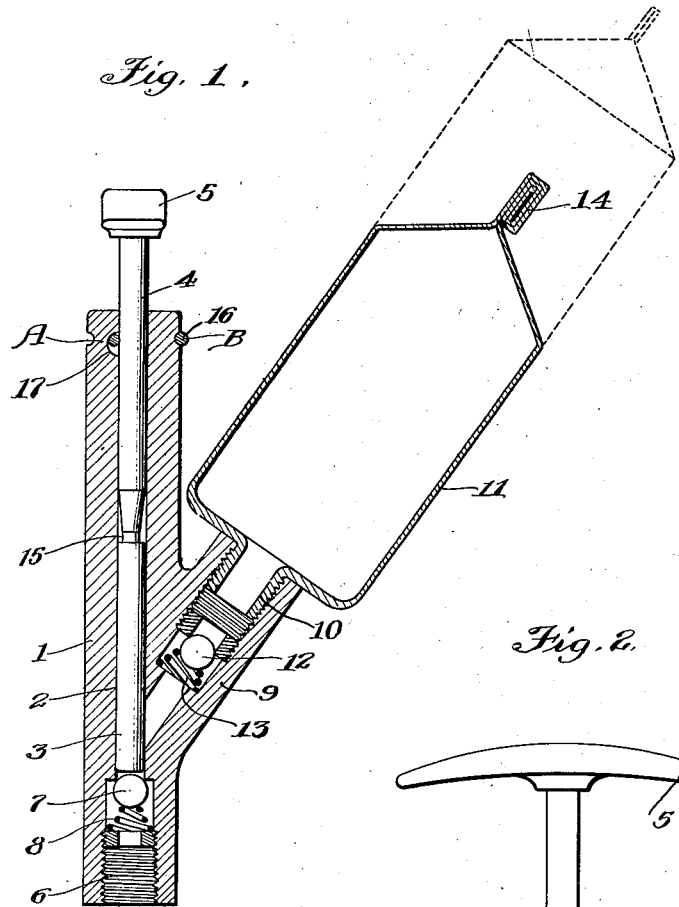
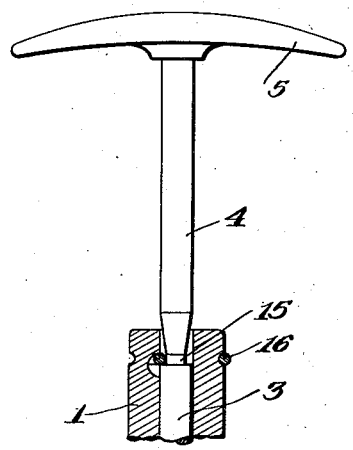
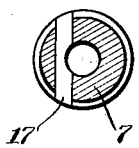
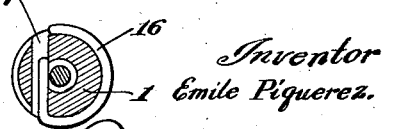

Patented Oct. 16, 1928.

1,687,789

UNITED STATES PATENT OFFICE.

EMILE PIQUEREZ, OF PARIS, FRANCE, ASSIGNOR TO THE BASSICK MANUFACTURING COMPANY, OF CHICAGO, ILLINOIS, A CORPORATION OF DELAWARE.

LUBRICANT COMPRESSOR.

Application filed April 16, 1925, Serial No. 23,741, and in France June 20, 1924.

My invention relates to lubricant compressors of the type in which the lubricant or any other similar liquid or fluid is kept in a removable receptacle, easily replaceable, attached to the body of the pump and functioning as a reservoir therefor, the whole being arranged to permit filling the compression cylinder by a simple manual operation or mechanism outside.

In the embodiment shown this receptacle comprises a tubular sheath, of malleable and deformable material, having one end closed and a threaded discharge tube at the other end to screw into the intake tube of the pump body, so that a simple pressure exerted on the sheath, for instance by hand, to flatten it out, will result in forcing the lubricant in the sheath into the compression cylinder. A check valve in the intake passage to the cylinder prevents any return of lubricant into the reservoir.

The invention relates further to various structural features of construction, which will be described hereinafter.

In the accompanying drawings:

Fig. 1 is a longitudinal section of a lubricant compressor according to the invention.

Fig. 2 is a section of the upper portion of the pump body showing the piston rod in its upper position.

Figs. 3 and 4 are two transverse sections of the pump body on the line A—B of Fig. 1, showing the means for retaining the piston rod.

As shown in Fig. 1, the device comprises a simple body provided with a bore 2, forming the compression cylinder. A piston, or plunger 3 is movable in this cylinder, and integral with a rod 4, terminating at its upper end in an operating handle 5. The cylinder 2 is continued as a tubular passage 6 constituting the discharge passage, which is separated from the cylinder by a check valve, such as the ball 7, normally held pressed against its seat by a spring 8.

At the lower end of the cylinder 2, the inlet tube 9 branches off at an angle with respect to the body 1. This inlet tube comprises a threaded portion at its end into which the threaded tube 10 of the lubricant reservoir 11 is screwed. A check valve 12 is held in place by a spring 13, and positioned in the tube 9.

In the embodiment shown the lubricant reservoir comprises a tubular sheath of malleable and deformable material such as lead, tin, thin cardboard, heavy paraffined paper, etc., the bottom of which is closed by a clip 14, while the other end carries the connecting tube 10, for mounting it on the body of the pump for operation.

In the embodiment illustrated, the operating rod 4 is kept in the compressor by forming thereon an annular inset 15, which in the upper position is engaged by a clip 16 entering a transverse bore 17, in body 1, and then bent around the body in a groove formed for the purpose. It will be apparent that this sort of stop facilitates easy and rapid assembly and disassembly of the device when necessary.

The operation is as follows:

The piston 3 being, for example, at the lower end of its stroke, in the position shown in Fig. 1, it will only be necessary to exert external pressure on the yieldable envelope of the tubular reservoir 11, to expel the lubricant in this reservoir into the cylinder tube. The discharge thus set up will force the valve 12 open, and push the piston up in the cylinder 2, which will thus be filled with lubricant. It is then only necessary to push down on the handle 5 by hand or strike it with a hammer or similar tool to discharge the lubricant under high pressure through the tube 6, to which the discharge tube, (not shown) is connected, the valve 12 preventing any return of lubricant into the reservoir 11. The reservoir will thus be exhausted of its contents step by step, and when it is completely empty it will be unscrewed from the inlet 9, and replaced by a full tube.

It will be understood that the tubular reservoir employed can contain any suitable material either for oiling or cleaning, such as grease, oil, gasoline, etc., which can thus be applied at will.

Without further elaboration, the foregoing will so fully explain the gist of my invention that others may, by applying current knowledge, readily adapt the same for use under various conditions of service without eliminating certain features which may properly be said to constitute the essential items of novelty involved, which items are intended to be defined and secured to me by the following claims:

I claim—

1. A lubricant compressor comprising a cylinder, a plunger rod slidable in said cylinder, said plunger having an annular groove intermediate its ends, and a resilient clip removably mounted on said cylinder for engaging said groove to limit withdrawal of said plunger.

2. A booster device comprising a body having a longitudinal bore and means at one end for attachment to a lubricant receiving device, said means being in alignment with said bore, a plunger slidable in said bore and projecting from said body, a head at the outer end of said plunger, said head being adapted to receive a hammer blow, a check valved inlet port, and means for forcing lubricant into said cylinder through said port to force said plunger outwardly, whereby lubricant may be forced into said lubricant receiving device under sudden high pressure by a blow struck upon the head of said plunger causing inward movement of said plunger.

3. A pressure booster device comprising a body having a longitudinal bore, means at one end of said bore and in actual alignment therewith for attaching said member to a bearing to be lubricated, a plunger slidable in said bore and projecting from the other end thereof, the projecting end being exposed so as to be adapted to be struck with a hammer or the like, and check valved means for supplying lubricant to said bore under pressure thereby forcing said plunger outwardly, said plunger being adapted to be forced inwardly by sudden impact to force the lubricant into the bearing under high pressure.

4. A pressure booster device comprising a member having a lubricant chamber, a connection for attachment to a bearing aligned with said chamber, a plunger reciprocable in said chamber extending therefrom, and having a head at its protruding end adapted to receive a hammer blow, and means to supply said chamber with lubricant under pressure.

5. A pressure booster device comprising a member having a lubricant chamber, a connection for attachment to a bearing aligned with said chamber, a plunger reciprocable in said chamber, extending therefrom, and having a head at its protruding end, said head being adapted to receive a hammer blow, means to supply said chamber with lubricant under pressure, and a check valve between said last named means and said chamber, whereby said head may be struck thereby to cause an explosive pressure upon the lubricant in said chamber.

In witness whereof, I hereunto subscribe my name this 23d day of March, 1925.

EMILE PIQUEREZ.